(12) United States Patent
Tagami

(10) Patent No.: US 12,379,847 B2
(45) Date of Patent: Aug. 5, 2025

(54) STORAGE DEVICE AND MEMORY SYSTEM

(71) Applicant: Kioxia Corporation, Tokyo (JP)

(72) Inventor: Shinichiro Tagami, Kawasaki Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/447,505

(22) Filed: Aug. 10, 2023

(65) Prior Publication Data
US 2024/0094913 A1 Mar. 21, 2024

(30) Foreign Application Priority Data
Sep. 21, 2022 (JP) .................. 2022-150518

(51) Int. Cl.
*G06F 3/06* (2006.01)
(52) U.S. Cl.
CPC .......... *G06F 3/0611* (2013.01); *G06F 3/0659* (2013.01); *G06F 3/0679* (2013.01)
(58) Field of Classification Search
CPC .... G06F 3/0611; G06F 3/0659; G06F 3/0679; G06F 3/0625; G06F 3/0634
USPC ........................................ 711/154
See application file for complete search history.

(56) References Cited

U.S. PATENT DOCUMENTS

| 7,953,940 | B2 | 5/2011 | Kezuka et al. | |
|---|---|---|---|---|
| 9,477,679 | B2 | 10/2016 | Stokely et al. | |
| 11,119,654 | B2 | 9/2021 | Zolotow et al. | |
| 2019/0377635 | A1* | 12/2019 | Xiong | G06F 11/1068 |
| 2020/0019311 | A1* | 1/2020 | Zolotow | G06F 3/067 |
| 2021/0081326 | A1* | 3/2021 | Curewitz | G06F 12/0284 |
| 2024/0069783 | A1* | 2/2024 | Roberts | G06F 3/061 |

FOREIGN PATENT DOCUMENTS

JP 5094193 B2 12/2012

* cited by examiner

*Primary Examiner* — Hua J Song
(74) *Attorney, Agent, or Firm* — Foley & Lardner LLP

(57) ABSTRACT

A storage device includes: a non-volatile memory; a parameter storage unit that stores a plurality of parameters for setting different operating conditions in the non-volatile memory; an access pattern analysis unit that analyzes an access pattern indicating a tendency to access the non-volatile memory by a command from a host device; a parameter selection unit that selects an optimal parameter from among the plurality of parameters based on the access pattern analyzed by the access pattern analysis unit; and an access control unit that accesses the non-volatile memory in a state where the optimal parameter is set in the non-volatile memory.

17 Claims, 5 Drawing Sheets

2 : MEMORY SYSTEM

STORAGE DEVICE AND MEMORY SYSTEM

CROSS-REFERENCE TO RELATED APPLICATION

This application is based upon and claims the benefit of priority from Japanese Patent Application No. 2022-150518, filed Sep. 21, 2022, the entire contents of which are incorporated herein by reference.

FIELD

Embodiments described herein relate generally to a storage device and a memory system.

BACKGROUND

In a semiconductor memory of the related art, when a product is shipped or started up, parameters designating operating conditions of the semiconductor memory are set to initial values in advance. Since a value of the parameter can be set to only one, the value of the parameter is set to a value that causes the semiconductor memory to operate in an average manner. For this reason, when the semiconductor memory intends to be used under special operating conditions, it may be difficult to optimally operate the semiconductor memory.

DETAILED DESCRIPTION

At least one embodiment provides a storage device and a memory system capable of being operated under optimal operating conditions as needed.

In general, according to at least one embodiment, a storage device includes: a non-volatile memory; and a memory controller, a parameter storage unit (of the memory controller) that stores a plurality of parameters for setting different operating conditions in the non-volatile memory; an access pattern analysis unit (of the memory controller) that analyzes an access pattern indicating a tendency to access the non-volatile memory by a command from a host device; a parameter selection unit (of the memory controller) that selects an optimal parameter from among the plurality of parameters based on the access pattern analyzed by the access pattern analysis unit; and an access control unit (of the memory controller) that accesses the non-volatile memory in a state where the optimal parameter is set in the non-volatile memory.

Hereinafter, embodiments of the semiconductor storage device and the memory system will be described with reference to the drawings. Although main components of the storage device and the memory system will be mainly described below, the storage device and the memory system may have components and functions that are not illustrated or described. The following description does not exclude the components or functions not illustrated or described.

First Embodiment

Figure 1:
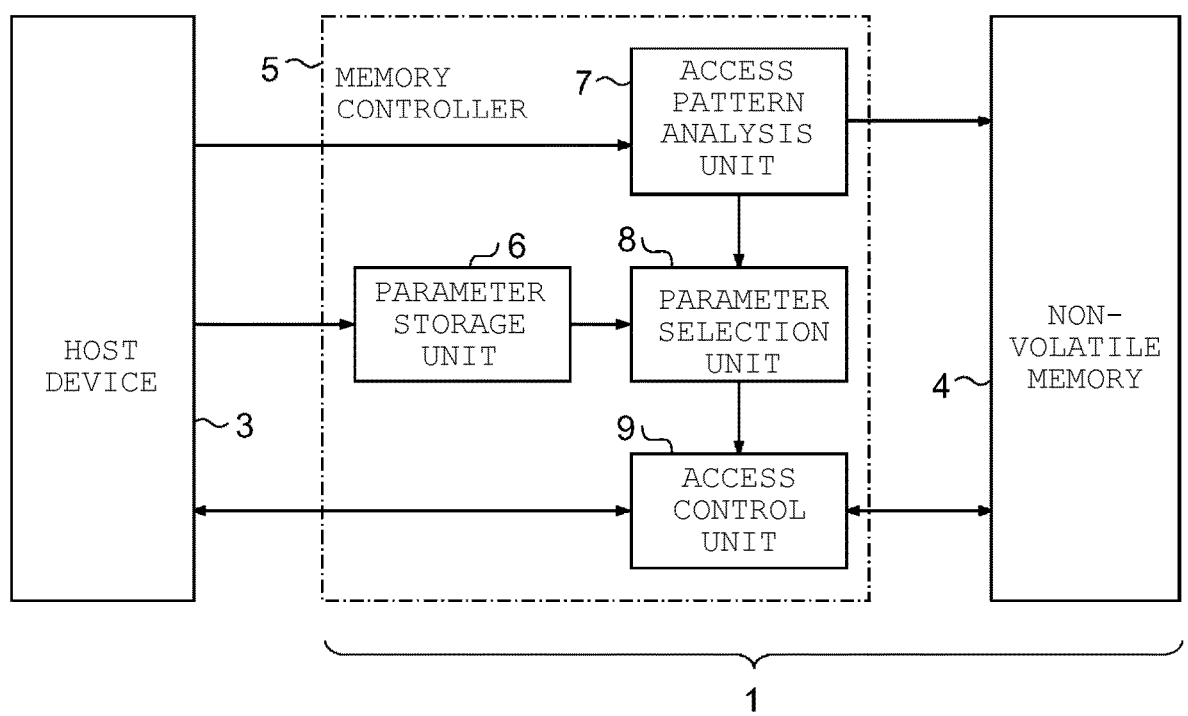
FIG. 1 is a block diagram illustrating a schematic configuration of a memory system including a semiconductor storage device according to a first embodiment.

FIG. 1 is a block diagram illustrating a schematic configuration of a memory system 2 including a semiconductor storage device 1 according to a first embodiment. The memory system 2 in FIG. 1 includes the semiconductor storage device 1 and a host device 3.

The semiconductor storage device 1 includes a non-volatile memory 4 and a memory controller 5. The non-volatile memory 4 is a semiconductor memory such as a NAND flash memory. It is noted that the non-volatile memory 4 may be a magnetoresistive random access memory (MRAM), a phase change RAM (PRAM), a resistive RAM (ReRAM), a ferroelectric RAM (FeRAM), or the like other than the NAND flash memory.

The non-volatile memory 4 performs a write operation and a read operation of data in units of a specific write unit. Furthermore, the non-volatile memory 4 erases data in units of an erase unit that is a plurality of write units. For example, when the non-volatile memory 4 is a NAND flash memory, the non-volatile memory 4 performs the write operation and the read operation in units of a page unit and erases data in units of a block unit.

The memory controller 5 performs processing related to control of the non-volatile memory 4. This processing includes conversion between a logical address and a physical address. The logical address is an address assigned by the host device 3 to data for the host device 3 to write to the semiconductor storage device 1 or to data for the host device 3 to read from the semiconductor storage device 1. The physical address is an address for specifying a write area or an erase area in the non-volatile memory 4.

The non-volatile memory 4 may include an input/output circuit, a logic control circuit, a status register, an address register, a command register, a sequencer, a ready/busy circuit, a voltage generation circuit, a memory cell array, a row decoder, a sense amplifier, a data register, and a column decoder.

The input/output circuit controls an input/output of a signal DQ with the memory controller 5. More specifically, the input/output circuit transmits data DAT (write data) received from the memory controller 5 to the data register, transmits a physical address ADD to the address register, and transmits a command CMD to the command register. In addition, the input/output circuit transmits status information STS received from the status register, data DAT (read data) received from the data register, and the physical address ADD received from the address register to the memory controller 5.

The logic control circuit receives various control signals from the memory controller 5. Then, the logic control circuit controls the input/output circuit and the sequencer according to the received control signal.

The status register temporarily stores the status information STS in, for example, the write operation, the read operation, and the erasing operation, and notifies the memory controller 5 whether the operation is completed normally.

The address register temporarily stores the physical address ADD received from the memory controller 5 via the input/output circuit. Then, the address register transfers a row address RA to the row decoder and a column address CA to the column decoder.

The command register temporarily stores the command CMD received via the input/output circuit and transfers the command CMD to the sequencer.

The sequencer controls entire operations of the non-volatile memory 4. More specifically, the sequencer controls, for example, the status register, the ready/busy circuit, the voltage generation circuit, the row decoder, the sense amplifier, the data register, the column decoder, and the like according to the command CMD stored by the command register to execute the write operation, the read operation, the erasing operation, and the like.

The ready/busy circuit transmits a ready/busy signal R/Bn to the memory controller 5 according to an operating status of the sequencer.

The voltage generation circuit generates voltages required for the write operation, the read operation, and the erasing operation under the control of the sequencer and supplies the generated voltages to, for example, the memory cell array, the row decoder, and the sense amplifier. The memory cell array includes a plurality of non-volatile memory cell transistors correlated with rows and columns. The sense amplifier applies the voltage supplied from the voltage generation circuit to the memory cell transistors in the memory cell array. The row decoder decodes the row address RA. The row decoder applies necessary voltages to the memory cell array based on the decoding result.

The non-volatile memory 4 includes a plurality of word lines. The write operation and the read operation are collectively performed on the plurality of memory cell transistors connected to one word line out of the memory cell transistors in the memory cell array.

When the non-volatile memory 4 is a NAND flash memory, the non-volatile memory 4 may be configured so that one memory cell transistor can store multiple values (multiple bits). The memory cell transistor has a control gate and a charge storage layer to store data in a non-volatile manner. The memory cell transistor has a threshold voltage that changes according to the number of electrons stored in the charge storage layer and stores information according to a difference in the threshold voltage. In the case of the memory cell transistor capable of storing multiple values, a plurality of pages are assigned to the plurality of memory cells connected to one word line WL.

The sense amplifier senses data read from the memory cell array during the read operation. Then, the sense amplifier transmits the read data to the data register. In addition, the sense amplifier transmits the write data to the memory cell array during the write operation.

The data register includes a plurality of latch circuits. The latch circuits temporarily store the write data or the read data. For example, in the write operation, the data register temporarily stores the write data received from the input/output circuit and transmits the write data to the sense amplifier. In addition, for example, in the read operation, the data register temporarily stores the read data received from the sense amplifier and transmits the read data to the input/output circuit.

The column decoder decodes the column address CA and selects the latch circuit in the data register according to the decoding result, for example, during the write operation, the read operation, and the erasing operation.

The memory controller 5 includes a parameter storage unit 6, an access pattern analysis unit 7, a parameter selection unit 8, and an access control unit 9.

The parameter storage unit 6 stores a plurality of parameters for setting different operating conditions in the non-volatile memory 4. The operating conditions are, for example, a pulse width and a voltage amplitude of a word line voltage when writing to and reading from the non-volatile memory 4. The non-volatile memory 4 according to at least one embodiment is premised on designating the operating conditions of the non-volatile memory 4 by parameters. The parameters are sometimes referred to as profiles, but are referred to as parameters in this specification.

The operating conditions of the non-volatile memory 4 that can be designated by parameters are freely selected, and various parameters may be provided. For example, the parameter storage unit 6 stores a first parameter, a second parameter, a third parameter, and a fourth parameter. The first parameter is used for prioritizing improvement in an access speed over a decrease in an error rate when reading the data written in the non-volatile memory 4. The second parameter is used for prioritizing the decrease in the error rate over the improvement in the access speed. The third parameter is used for lengthening a time for the non-volatile memory 4 to transition to a power saving mode. The fourth parameter is used for shortening the time for the non-volatile memory 4 to transition to the power saving mode. It is noted that the first to fourth parameters are merely examples of parameters. The power saving mode is sometimes called hibernation. The power saving mode is a mode in which a power supply voltage supplied to at least some circuits in the semiconductor storage device 1 is lowered to reduce power consumption. When transitioning to the power saving mode, in some cases, a process of storing data in a volatile memory (not illustrated) managed by the host device 3 in the non-volatile memory 4 is performed. A normal mode is a mode in which a predetermined power supply voltage is supplied to each unit in the semiconductor storage device 1.

The improvement in the access speed denotes performing high-speed writing or high-speed reading with respect to the non-volatile memory 4. The improvement in the access speed can be rephrased as the improvement in an access performance.

The Improvement in the access speed can be a factor in increasing the error rate. For example, in order to perform high-speed writing on the non-volatile memory 4, it is necessary to reduce the number of program loops for repeating the application of a program voltage and the application of a verification voltage when writing data to the non-volatile memory 4, to increase the number of memory cells for which reading is omitted in verification after writing data to the non-volatile memory 4, or to increase the number of error bits when determining the verification pass, and thus, there is a concern that the error rate increases. In addition, when performing high-speed reading with respect to the non-volatile memory 4, there is a concern that a read voltage may adversely affect surrounding memory cells because it is necessary to set the read voltage to be higher than that for normal reading. Specifically, increasing the read voltage may change the amount of charges stored in a charge storage region of the surrounding memory cells, and thus, there is a concern that garbled bits occur. The program voltage application operation is an operation for applying the program voltage to the word line (hereinafter referred to as "selected word line") connected to one or more memory cells MT (hereinafter referred to as "selected memory cell") to be written, and for raising a threshold voltage of the selected memory cell MT toward a threshold voltage corresponding to a desired data value. A program verification is an operation for verifying whether the threshold voltage of the selected memory cell MT reaches the threshold voltage corresponding to the desired data value, that is, whether the desired data value is written to the selected memory cell MT, and the verification voltage is a voltage applied to the selected word line during the verification.

In this manner, performing high-speed reading may cause a concern that the error rate increases. As the error rate increases, a frequency of an error correction process increases, and thus, the number of times of writing and the number of times of erasing with respect to the non-volatile memory 4 increases overall, so that a lifetime of the non-volatile memory 4 decreases.

In summary, when the access performance of the non-volatile memory 4 is increased, the error rate is increased, and thus, the lifetime is shortened. In addition, when the access performance of the non-volatile memory 4 is decreased, the error rate is decreased, and thus, the lifetime is lengthened.

It is noted that, in this specification, both writing and reading data to and from the non-volatile memory 4 are collectively referred to as accessing, but the term "accessing" also includes the case where only one of writing and reading is performed.

On the other hand, when no command is transmitted from the host device 3 for a certain period of time or longer, the semiconductor storage device 1 voluntarily transitions to the power saving mode. Once transitioning to the power saving mode, it takes some time to return to the normal mode. For example, when a write command or a read command is transmitted from the host device 3 while the semiconductor storage device 1 is in the power saving mode, the time required for returning the response to the command includes the time required for returning from the power saving mode, so that a latency of the write command or the read command is worsened.

Therefore, when the time until transitioning to the power saving mode is shortened, the period of time of the power saving mode in a predetermined period of time is lengthened, and thus, the power consumption of the semiconductor storage device 1 can be reduced. However, since it takes time to return from the power saving mode to the normal mode, the latency to commands from the host device 3 is worsened. Conversely, when the time until transitioning to the power saving mode is lengthened, the power consumption of the semiconductor storage device 1 is increased. However, since the number of times of returning from the power saving mode to the normal mode is decreased, the latency to the commands from the host device 3 is improved.

Thus, the performance of the non-volatile memory 4 can be made different depending on which of the plurality of parameters stored in the parameter storage unit 6 is selected and set in the non-volatile memory 4.

The parameter storage unit 6 stores the plurality of parameters transmitted from, for example, the host device 3. The host device 3 transmits the plurality of parameters that can be stored in the parameter storage unit 6 to the non-volatile memory 4 when the memory system 2 is powered on. Alternatively, the plurality of parameters may be stored in the parameter storage unit 6 separately from the host device 3 when the memory system 2 is manufactured.

The access pattern analysis unit 7 analyzes an access pattern indicating a tendency to access the non-volatile memory 4 by the commands from the host device 3. The tendency to access is, for example, that an amount of access per unit time is higher than normal, that writing is performed more frequently than reading, or that reading from the specific memory area is performed intensively. Alternatively, the tendency to access includes long or short transmission intervals of the commands that the host device 3 transmits to the non-volatile memory 4. The access pattern analysis unit 7 analyzes the access pattern of the host device 3 based on the results of continuous monitoring of accesses to the non-volatile memory 4 by the commands from the host device 3. The access pattern analysis unit 7 may always analyze the access pattern of the host device 3 or may intermittently analyze the access pattern.

The access patterns analyzed by the access pattern analysis unit 7 are, for example, a first access pattern in which the amount of access to the non-volatile memory 4 per unit time is larger than a predetermined threshold value, a second access pattern in which the amount of access to the non-volatile memory 4 per unit time is equal to or less than the predetermined threshold value, a third access pattern in which a command transmission interval from the host device 3 to the non-volatile memory 4 is shorter than a predetermined threshold value, and a fourth access pattern in which the command transmission interval from the host device 3 to the non-volatile memory 4 is equal to or longer than the predetermined threshold value. The above-described first to fourth access patterns are examples of the access patterns, and the types of the access patterns are freely selected.

The parameter selection unit 8 selects an optimal parameter from among the plurality of parameters based on the access pattern analyzed by the access pattern analysis unit 7. The parameter selection unit 8 selects the optimal parameters according to the result of monitoring the tendency to access the non-volatile memory 4 by the commands from the host device 3.

When the tendency to access the non-volatile memory 4 by the commands from the host device 3 is analyzed as the first access pattern in which the amount of access per unit time is large, the parameter selection unit 8 selects the first parameter prioritizing the improvement in the access speed over the decrease in the error rate as the optimal parameter. In addition, when the tendency to access to the non-volatile memory 4 is analyzed as the second access pattern in which the amount of access to the non-volatile memory 4 per unit time is equal to or less than the threshold value, the parameter selection unit 8 selects the second parameter prioritizing the decrease in the error rate over the improvement in the access speed as the optimal parameter. Further, when the command transmission interval from the host device 3 to the non-volatile memory 4 is analyzed as the third access pattern that is shorter than the predetermined threshold value, the parameter selection unit 8 selects the third parameter lengthening the time required for transitioning to the power saving mode as the optimal parameter. In addition, when the command transmission interval from the host device 3 to the non-volatile memory 4 is analyzed as the fourth access pattern that is equal to or longer than the predetermined threshold value, the parameter selection unit 8 selects the fourth parameter shortening the time required for transitioning to the power saving mode as the optimal parameter.

The access control unit 9 accesses the non-volatile memory 4 in a state where the optimal parameter is set in the non-volatile memory 4. When the parameter selection unit 8 selects the optimal parameter, the access control unit 9 in the semiconductor storage device 1 according to the first embodiment accesses the non-volatile memory 4 with the optimal parameter without checking with the host device 3.

For example, when the tendency to access the non-volatile memory 4 by the commands from the host device 3 is analyzed as the first access pattern in which the amount of access per unit time is large, the access control unit 9 accesses the non-volatile memory 4 based on the first parameter prioritizing the improvement in the access speed over the decrease in the error rate. Accordingly, the access control unit 9 can operate the non-volatile memory 4 under the operating conditions matching the tendency of the host device 3 to access the non-volatile memory 4.

The semiconductor storage device 1 according to the present embodiment may conform to, for example, a universal flash storage (UFS) standard. The UFS standard is a NAND flash memory standard for digital cameras, smartphones, and home electric appliances and is formulated by the Joint Electron Device Engineering Councils (JEDEC).

Figure 2:
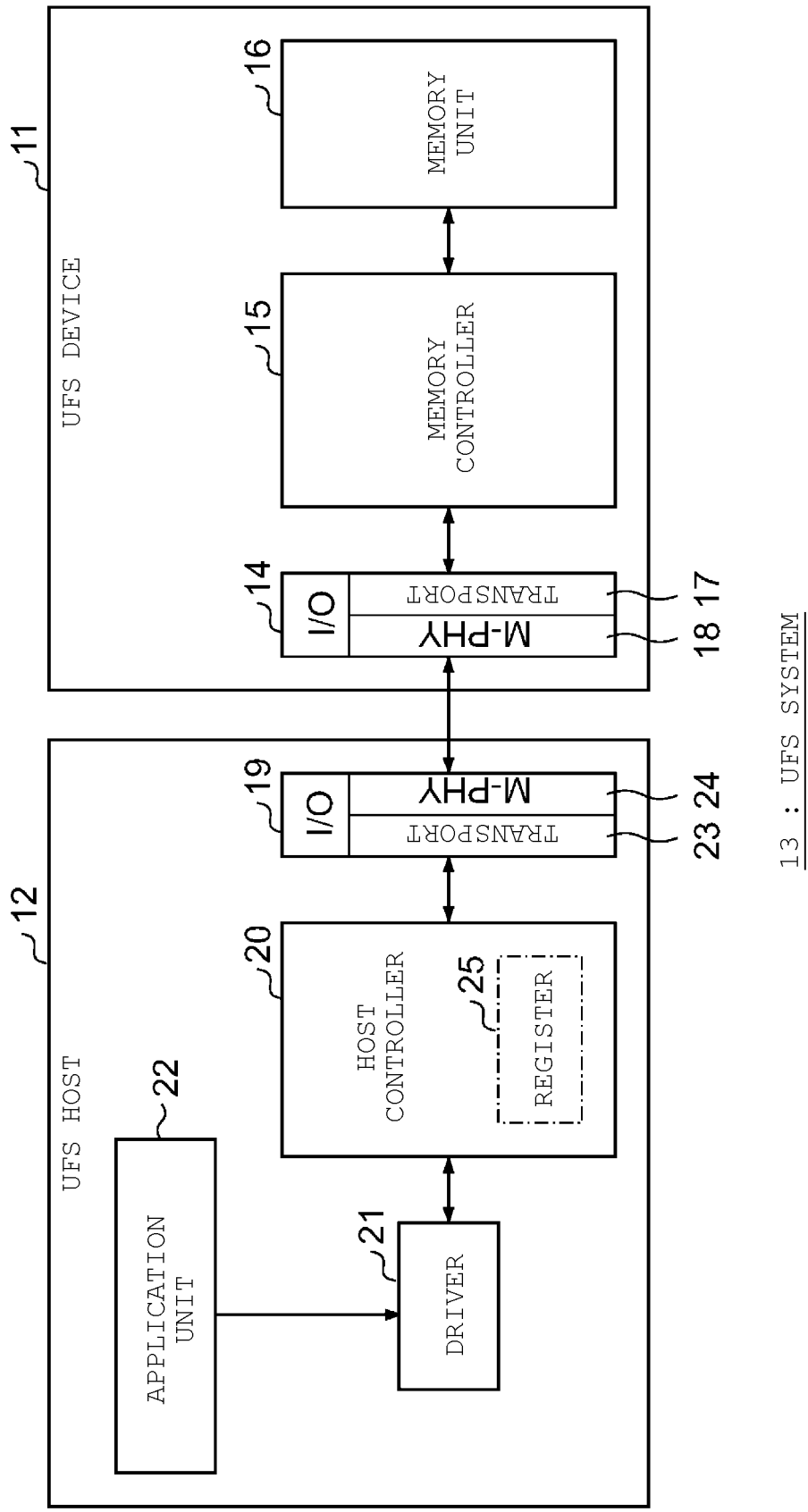
FIG. 2 is a block diagram of a UFS system including a UFS device and a UFS host.

FIG. 2 is a block diagram of a memory system 2 (also called a UFS system 13) including a UFS device 11 and a host device 3 (also called a UFS host 12).

The UFS device 11 in FIG. 2 includes an interface unit (I/F) 14, a memory controller 15, and a memory unit 16. The interface unit 14 includes a transport layer 17 using a mobile industry processor interface unified protocol (MIPI UniPro), and an MIPI M-PHY physical layer 18. Although omitted in FIG. 1, the interface unit 14 performs protocol conversion of various signals transmitted and received between the UFS device 11 and the UFS host 12. The memory controller 15 has the same functions as the memory controller 5 in FIG. 1. The memory unit 16 is configured by using a NAND flash memory and has the same function as the non-volatile memory 4 in FIG. 1.

The UFS host 12 in FIG. 2 includes an interface unit (I/F) 19, a host controller 20, a driver 21, and an application unit 22. The interface unit 19 includes a transport layer 23 using the MIPI UniPro, and an MIPI M-PHY physical layer 24. The host controller 20 controls operations of the UFS host 12. A register 25 storing various kinds of data is provided in the host controller 20. The driver 21 drives the host controller 20 according to instructions from the application unit 22.

Figure 3:
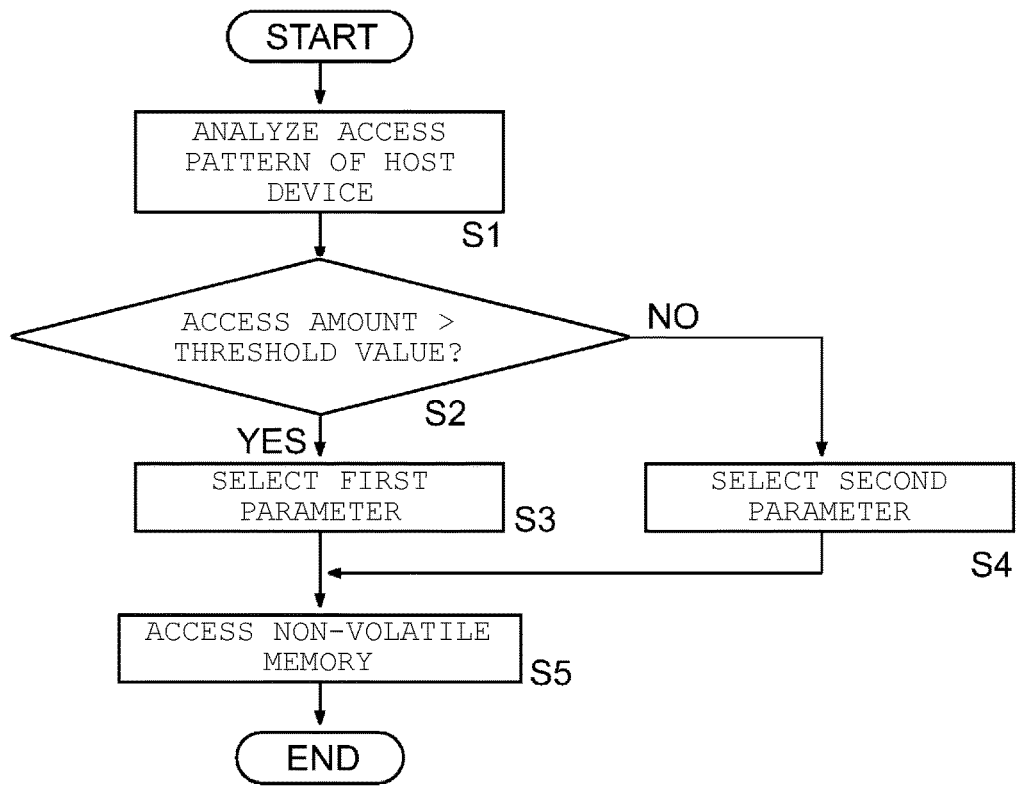
FIG. 3 is a flowchart illustrating a processing operation for determining which of an access speed and a lifetime of a non-volatile memory is to be prioritized.
Figure 4:
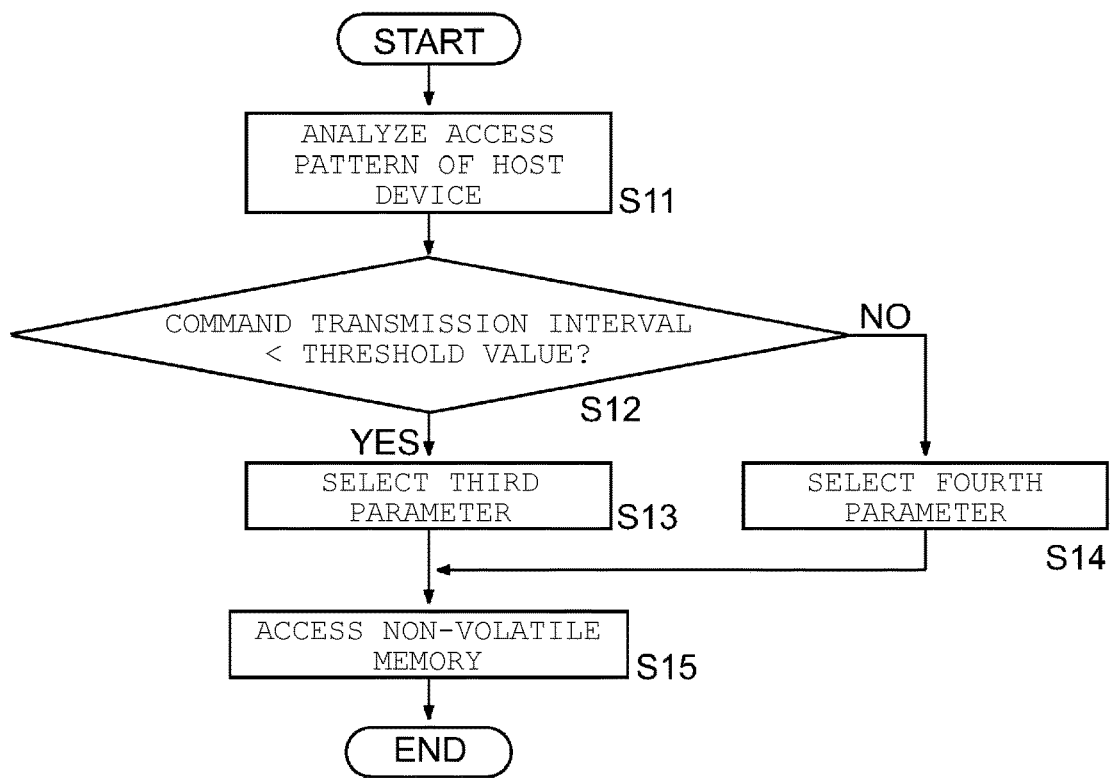
FIG. 4 is a flowchart illustrating a processing operation for determining a length of a time for the non-volatile memory to transition to a power saving mode.

FIGS. 3 and 4 are flowcharts illustrating processing operations of the semiconductor storage device 1 according to the first embodiment. FIG. 3 illustrates a processing operation for determining which of the access speed and the lifetime of the non-volatile memory 4 is to be prioritized. FIG. 4 illustrates a processing operation for determining the length of the time for the non-volatile memory 4 to transition to the power saving mode. When the host device 3 starts accessing the semiconductor storage device 1, the processes of FIG. 3 or FIG. 4 are started.

First, the process of FIG. 3 will be described. When the host device 3 issues the command to start accessing the semiconductor storage device 1, the access pattern analysis unit 7 analyzes the access pattern of the host device 3 (step S1).

The parameter selection unit 8 selects the optimal parameter from among the plurality of parameters stored in the parameter storage unit 6 based on the result of analysis of the access pattern over the predetermined period of time by the access pattern analysis unit 7 (steps S2 to S4). More specifically, it is determined whether the amount of access per unit time is larger than the predetermined threshold value (step S2), and when the amount of access per unit time is larger than the predetermined threshold value, the first parameter prioritizing the improvement in the access speed over the decrease in the error rate is selected (step S3). On the other hand, when the amount of access per unit time is equal to or less than the predetermined threshold value, the second parameter prioritizing the decrease in the error rate over the improvement in the access speed is selected (step S4).

The access control unit 9 performs accessing the non-volatile memory 4 based on the first parameter selected in step S3 or the second parameter selected in step S4 (step S5).

As described above, in the process of FIG. 3, it is possible to select whether to prioritize the access speed of the non-volatile memory 4 or to prioritize the lifetime, based on the access pattern of the host device 3.

Next, the process of FIG. 4 will be described. Step S11 is the same as step S1. The parameter selection unit 8 selects the optimal parameter from among the plurality of parameters stored in the parameter storage unit 6 based on the result of analysis of the access pattern over the predetermined period of time by the access pattern analysis unit 7 (steps S12 to S14). More specifically, it is determined whether the command transmission interval from the host device 3 to the non-volatile memory 4 is shorter than the predetermined threshold value (step S12), and when the command transmission interval is shorter than the predetermined threshold value, the third parameter lengthening the time for the non-volatile memory 4 to transition to the power saving mode is selected (step S13). On the other hand, when the command transmission interval is equal to or longer than the predetermined threshold value, the fourth parameter shortening the time for the non-volatile memory 4 to transition to the power saving mode is selected (step S14).

The access control unit 9 performs accessing the non-volatile memory 4 based on the third parameter selected in step S13 or the fourth parameter selected in step S14 (step S15).

In the above description, the example in which the parameters of the non-volatile memory 4 are changed based on the optimal parameters selected by the parameter selection unit 8 without obtaining the approval of the host device 3 is illustrated, but, the non-volatile memory 4 may have a plurality of operation modes. In the following, an example in which the non-volatile memory 4 has first to fourth operation modes will be described.

As described above, the first operation mode is a mode in which the non-volatile memory 4 itself analyzes the access pattern of the host device 3 and changes the parameters based on the result of the analysis.

The second operation mode is a mode in which the host device 3 forcibly sets the parameters of the non-volatile memory 4. In this case, since the non-volatile memory 4 sets the parameters according to the instructions from the host device 3, the parameters are not changed according to the determination of the non-volatile memory 4 itself.

The third operating mode is a mode in which the host device 3 forcibly sets the parameters of the non-volatile memory 4 by default. The parameters set by default are the average operating conditions of the non-volatile memory 4.

The fourth operation mode is a mode in which the host device 3 determines the threshold value used for analysis by the access pattern analysis unit 7. The host device 3 sets the above-described threshold value, for example, with the UFS standard write buffer command. The non-volatile memory 4 performs the above-described process of FIG. 3 or FIG. 4 based on the threshold value determined by the host device 3.

The host device 3 may freely select any one of the first to fourth operation modes described above. For example, the host device 3 may change and check the operation mode of the non-volatile memory 4 by using the UFS standard flag. Specifically, by enabling the first to fourth operation modes to be identified according to the set values of the flags described above, the host device 3 can read the set values of the flags and can check the current operation mode of the non-volatile memory 4. In addition, the host device 3 can change the operation mode of the non-volatile memory 4 to any operation mode by updating the set value of the flag.

Alternatively, the host device 3 may check the operation mode of the non-volatile memory 4 by using the Vendor Specific Read Functions of QUERY FUNCTIONS=7Fh (any value from 40h to 7Fh is assigned) of the UFS standard query request UPIU (UFS protocol information units). In this case, the non-volatile memory 4 may return operation mode information to the host device 3 via the query response UPIU.

Since the second to fourth operation modes described above are not essential for the processing operation of the semiconductor storage device 1 according to the first embodiment, the function allowing the host device 3 to freely select the plurality of operation modes of the non-volatile memory 4 is not required to be provided.

Thus, in the first embodiment, the memory controller 5 in the semiconductor storage device 1 analyzes the access pattern of the host device 3 with respect to the non-volatile memory 4, selects the optimal parameters based on the result of the analysis, and performs accessing the non-volatile memory 4. Accordingly, the operating conditions of the non-volatile memory 4 can be spontaneously switched according to an access status of the host device 3.

Second Embodiment

In the first embodiment, the optimal parameter selected by the parameter selection unit 8 is set in the non-volatile memory 4 without checking with the host device 3. In contrast, a second embodiment has characteristics of checking with the host device 3 whether the optimal parameter selected by the parameter selection unit 8 is to be adopted.

Figure 5:
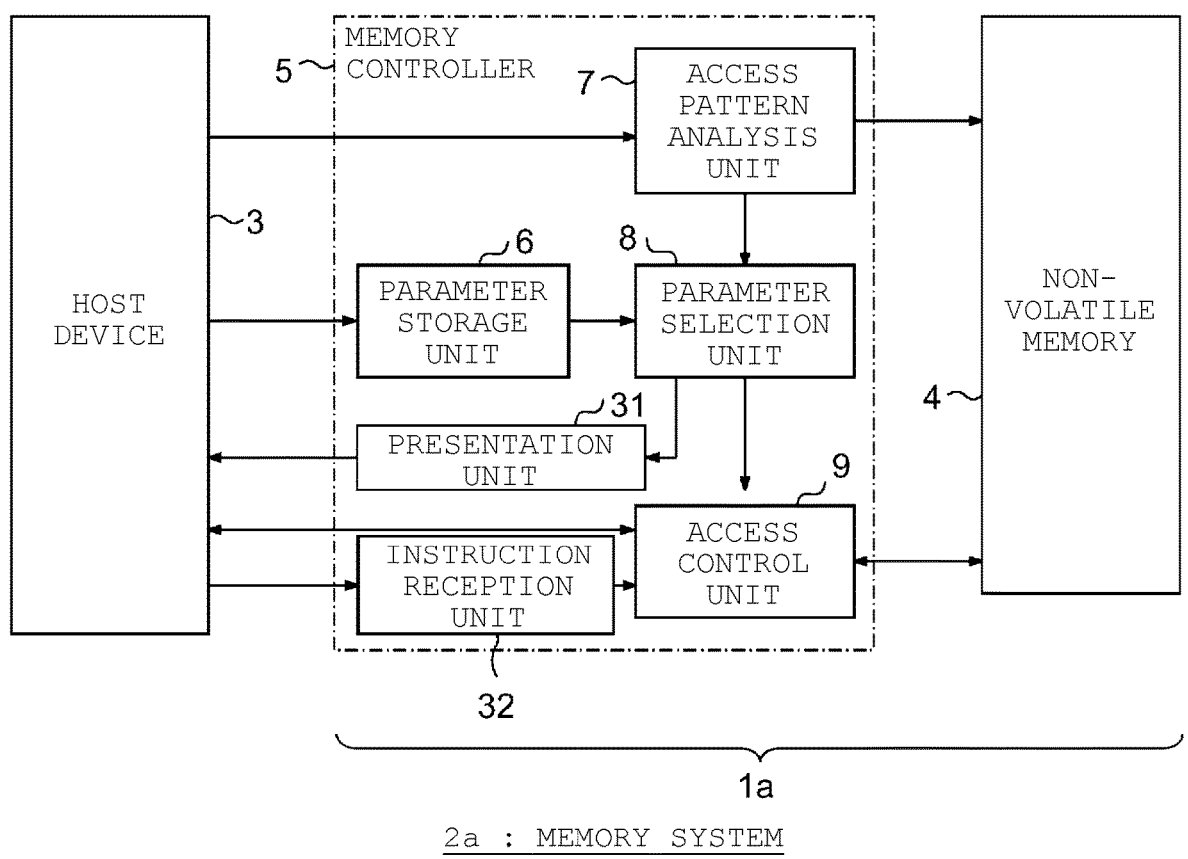
FIG. 5 is a block diagram illustrating a schematic configuration of a memory system including a semiconductor storage device according to a second embodiment.

FIG. 5 is a block diagram illustrating a schematic configuration of a memory system 2a including a semiconductor storage device 1a according to the second embodiment. In FIG. 5, the same components as in FIG. 1 are denoted by the same reference numerals, and the differences will be mainly described below.

The memory controller 5 in the semiconductor storage device 1a in FIG. 5 includes a presentation unit 31 (of the memory controller) and an instruction reception unit 32 (of the memory controller) in addition to the configuration of the memory controller 5 in FIG. 1.

The presentation unit 31 presents the optimal parameters selected by the parameter selection unit 8 to the host device 3. For example, the presentation unit 31 may include information on the above-described optimal parameter in a response to a UFS standard read command, a write command, a synchronized cache command, or an UNMAP command.

The host device 3 examines whether to switch to the presented optimal parameters and transmits instruction information indicating whether to change to the optimal parameters to the semiconductor storage device 1a. For example, when the host device 3 approves the presented optimal parameters, the host device 3 may instruct the change to the optimal parameters with the MODE=01h Vendor Specific command of the commands stored in the write buffer.

The instruction reception unit 32 in the memory controller 5 receives the instruction information of the host device 3. The access control unit 9 determines whether to change the parameters of the non-volatile memory 4 to the optimal parameters based on the instruction information of the host device 3 received by the instruction reception unit 32.

Figure 6:
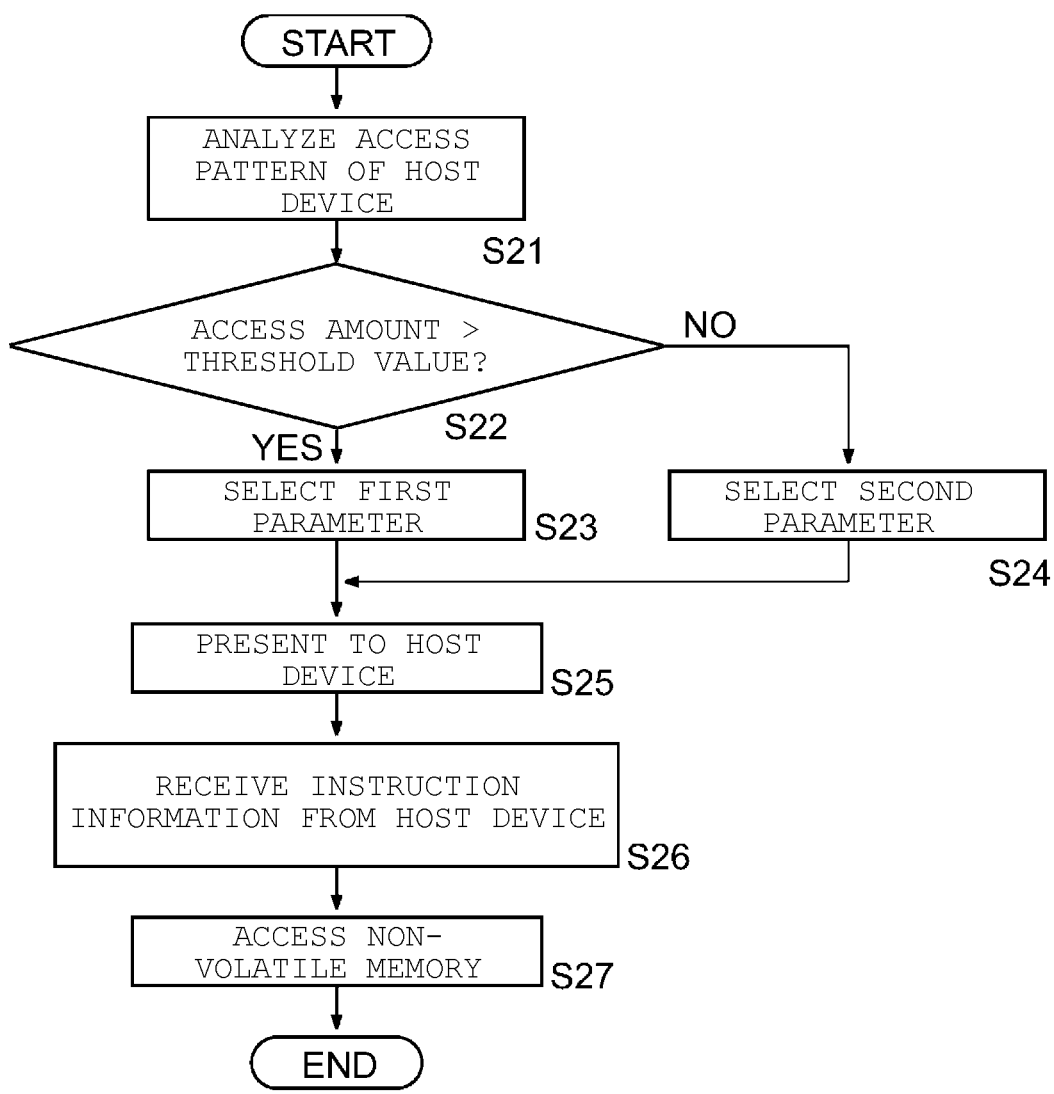
FIG. 6 is a flowchart illustrating a processing operation of the semiconductor storage device according to the second embodiment.

FIG. 6 is a flowchart illustrating a processing operation of the semiconductor storage device 1a according to the second embodiment. Steps S21 to S24 in the flowchart of FIG. 6 are the same as steps S1 to S4 in FIG. 3. The presentation unit 31 presents the first parameter selected in step S23 or the second parameter selected in step S24 to the host device 3 (step S25).

After that, the instruction reception unit 32 receives the instruction information from the host device 3 (step S26). Next, the access control unit 9 determines whether to change the parameters of the non-volatile memory 4 to the optimal parameters based on the instruction information from the host device 3, and performs accessing the non-volatile memory 4 (step S27).

As described above, in the second embodiment, the memory controller 5 in the semiconductor storage device 1a selects the optimal parameters of the non-volatile memory 4 based on the access pattern of the host device 3, presents to the host device 3 whether to adopt the selected optimal parameters, and asks for the determination of the host device 3. When the host device 3 instructs the change to the optimal parameters, the parameters of the non-volatile memory 4 are changed. Accordingly, the parameters of the non-volatile memory 4 can be optimized with the approval of the host device 3.

APPENDIX

Item 1

A semiconductor storage device including:

a non-volatile memory;

a parameter storage unit that stores a plurality of parameters for setting different operating conditions in the non-volatile memory;

an access pattern analysis unit that analyzes an access pattern indicating a tendency to access the non-volatile memory by a command from a host device;

a parameter selection unit that selects an optimal parameter from among the plurality of parameters based on the access pattern analyzed by the access pattern analysis unit; and an access control unit that accesses the non-volatile memory in a state where the optimal parameter is set in the non-volatile memory.

Item 2

The semiconductor storage device according to item 1, in which the access pattern analysis unit analyzes at least one of an access pattern when writing data to the non-volatile memory by the command from the host device and an access pattern when reading data from the non-volatile memory by the command from the host device.

Item 3

The semiconductor storage device according to item 1 or 2, in which the parameter storage unit stores the plurality of parameters transmitted from the host device.

Item 4

The semiconductor storage device according to any one of items 1 to 3, in which when the optimal parameter is selected by the parameter selection unit, the access control unit accesses the non-volatile memory without checking with the host device in a state where the optimal parameter is set in the non-volatile memory.

Item 5

The semiconductor storage device according to any one of items 1 to 3, further including a presentation unit that presents the optimal parameter to the host device, in which when the host device instructs a change to the optimal parameter in response to a presentation by the presentation unit, the access control unit accesses the non-volatile memory in a state where the optimal parameter is set in the non-volatile memory.

Item 6

The semiconductor storage device according to item 5, in which the presentation unit includes information on the optimal parameter in a response to a read command, a write command, a synchronized cache command, or an UNMAP command conforming to a universal flash storage (UFS) standard, and transmits the same to the host device.

Item 7

The semiconductor storage device according to item 5 or 6, further including a write buffer that stores change instruction information about the change to the optimal parameter from the host device, the write buffer conforming to the UFS standard, in which
when the change instruction information is stored in the write buffer, the access control unit accesses the non-volatile memory in the state where the optimal parameter is set in the non-volatile memory.

Item 8

The semiconductor storage device according to any one of items 1 to 7, in which the access pattern analysis unit analyzes any one of a first access pattern in which an amount of access to the non-volatile memory per unit time is larger than a predetermined threshold value and a second access patterns in which the amount of access to the non-volatile memory per unit time is equal to or less than the threshold value.

Item 9

The semiconductor storage device according to item 8, in which the parameter selection unit selects a first parameter prioritizing improvement in an access speed over a decrease in an error rate when being analyzed as the first access pattern by the access pattern analysis unit, and selects a second parameter prioritizing the decrease in the error rate over the improvement in the access speed when being analyzed as the second access pattern.

Item 10

The semiconductor storage device according to item 9, in which
the access speed is a speed of writing to the non-volatile memory, and
the first parameter decreases the number of times of program when writing data to the non-volatile memory or increases the number of bits for which reading is omitted during a verification read more than the second parameter.

Item 11

The semiconductor storage device according to item 9, in which
the access speed is a speed of reading from the non-volatile memory, and
the first parameter shortens a lifetime of the non-volatile memory more than the second parameter.

Item 12

The semiconductor storage device according to any one of items 1 to 7, in which the access pattern analysis unit analyzes any one of a third access pattern in which a command transmission interval to the non-volatile memory from the host device is shorter than a predetermined threshold value and a fourth access pattern in which the command transmission interval to the non-volatile memory from the host device is equal to or longer than the threshold value.

Item 13

The semiconductor storage device according to item 12, in which the parameter selection unit increases a time required for transitioning to a power saving mode when being analyzed as the third access pattern by the access pattern analysis unit more than when being analyzed as the fourth access pattern by the access pattern analysis unit.

Item 14

The semiconductor storage device according to any one of items 8 to 13, in which the threshold value is designated by the host device.

Item 15

The semiconductor storage device according to any one of items 1 to 14, in which the non-volatile memory is a NAND flash memory.

Item 16

A memory system including:
a semiconductor storage device; and
a host device that issues a command for performing accessing including writing and reading with respect to the semiconductor storage device, in which
the semiconductor storage device includes
a non-volatile memory, a parameter storage unit that stores a plurality of parameters for setting different operating conditions in the non-volatile memory, an access pattern analysis unit that analyzes an access pattern indicating a tendency to access the non-volatile memory by the command from the host device, a parameter selection unit that selects an optimal parameter from among the plurality of parameters based on the access pattern analyzed by the access pattern analysis unit, and an access control unit that accesses the non-volatile memory in a state where the optimal parameter is set in the non-volatile memory.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A storage device comprising:
a non-volatile memory; and
a memory controller configured to:
store a plurality of parameters for setting different operating conditions in the non-volatile memory;
analyze an access pattern indicating a tendency to access the non-volatile memory by a command from a host device;
select an optimal parameter from among the plurality of parameters based on the access pattern analyzed;
access the non-volatile memory in a state where the optimal parameter is set in the non-volatile memory; and
present the optimal parameter to the host device, wherein when the host device instructs a change to the optimal parameter in response to a presentation by the memory controller, the memory controller accesses the non-volatile memory in a state where the optimal parameter is set in the non-volatile memory, and wherein the memory controller transmits information to the host device, the information including the optimal parameter in a response to a read command, a write command, a synchronized cache command, or an UNMAP command conforming to a universal flash storage (UFS) standard.

2. The storage device according to claim 1, wherein the memory controller is configured to analyze at least one of an access pattern when writing data to the non-volatile memory by the command from the host device and an access pattern when reading data from the non-volatile memory by the command from the host device.

3. The storage device according to claim 1, wherein the memory controller is configured to store the plurality of parameters transmitted from the host device.

4. The storage device according to claim 1, wherein, when the optimal parameter is selected, the memory controller accesses the non-volatile memory without checking with the host device in a state where the optimal parameter is set in the non-volatile memory.

5. The storage device according to claim 1, further comprising a write buffer being configured to store change instruction information about the change to the optimal parameter from the host device, the write buffer conforming to the UFS standard, wherein
when the change instruction information is stored in the write buffer, the memory controller accesses the non-volatile memory in a state where the optimal parameter is set in the non-volatile memory.

6. The storage device according to claim 1, wherein the non-volatile memory is a NAND flash memory.

7. The storage device according to claim 1, wherein
the non-volatile memory includes a word line and a plurality of memory cells connected to the word line, and
the operating condition includes a pulse width of a voltage applied to the word line when data is written to the plurality of memory cells.

8. The storage device according to claim 1, wherein
the non-volatile memory includes a word line and a plurality of memory cells connected to the word line, and
the operating condition includes a voltage amplitude of a voltage applied to the word line when data is written to the plurality of memory cells.

9. The storage device according to claim 1, wherein
the non-volatile memory includes a word line and a plurality of memory cells connected to the word line, and
the operating condition includes a pulse width of a voltage applied to the word line when data is read from the plurality of memory cells.

10. The storage device according to claim 1, wherein
the non-volatile memory includes a word line and a plurality of memory cells connected to the word line, and
the operating condition includes a voltage amplitude of a voltage applied to the word line when data is read from the plurality of memory cells.

11. The storage device according to claim 1, wherein
the non-volatile memory includes a word line and a plurality of memory cells connected to the word line, and
the operating condition includes at least one of:
a pulse width of a voltage applied to the word line when data is written to the plurality of memory cells,
a voltage amplitude of a voltage applied to the word line when data is written to the plurality of memory cells,
a pulse width of a voltage applied to the word line when data is read from the plurality of memory cells, or
a voltage amplitude of a voltage applied to the word line when data is read from the plurality of memory cells.

12. A storage device comprising:
a non-volatile memory; and
a memory controller configured to:
store a plurality of parameters for setting different operating conditions in the non-volatile memory;
analyze an access pattern indicating a tendency to access the non-volatile memory by a command from a host device;
select an optimal parameter from among the plurality of parameters based on the access pattern analyzed;
access the non-volatile memory in a state where the optimal parameter is set in the non-volatile memory;
analyze any one of a first access pattern in which an amount of access to the non-volatile memory per unit time is larger than a threshold value and a second access pattern in which the amount of access to the non-volatile memory per unit time is equal to or less than the threshold value; and select a first parameter prioritizing improvement in an access speed over a decrease in an error rate when the access pattern is analyzed as the first access pattern by the memory controller, and select a second parameter prioritizing the decrease in the error rate over the improvement in the access speed when the access pattern is analyzed as the second access pattern.

13. The storage device according to claim 12, wherein
the access speed is a speed of writing to the non-volatile memory, and
the first parameter is for decreasing the number of times of programming when writing data to the non-volatile memory or for increasing the number of bits for which reading is omitted during a verification read more than the second parameter.

14. The storage device according to claim 12, wherein
the access speed is a speed of reading from the non-volatile memory, and
the first parameter shortens a lifetime of the non-volatile memory more than the second parameter.

15. The storage device according to claim 12, wherein the threshold value is designated by the host device.

16. A storage device comprising:
a non-volatile memory; and
a memory controller configured to:
store a plurality of parameters for setting different operating conditions in the non-volatile memory;
analyze an access pattern indicating a tendency to access the non-volatile memory by a command from a host device;
select an optimal parameter from among the plurality of parameters based on the access pattern analyzed;
access the non-volatile memory in a state where the optimal parameter is set in the non-volatile memory; and
analyze any one of a third access pattern in which a command transmission interval to the non-volatile memory from the host device is shorter than a threshold value and a fourth access pattern in which the command transmission interval to the non-volatile memory from the host device is equal to or longer than the threshold value.

17. The storage device according to claim 16, wherein the memory controller is configured to lengthen a time required for transitioning to a power saving mode when the access pattern is analyzed as the third access pattern more than a time required for transitioning to the power saving mode when the access pattern is analyzed as the fourth access pattern.

* * * * *